(12) United States Patent
Ichinomiya et al.

(10) Patent No.: US 10,370,215 B2
(45) Date of Patent: Aug. 6, 2019

(54) NIP ROLLER AND METHOD OF MANUFACTURING FILM ROLL BODY

(71) Applicants: TORAY INDUSTRIES, INC., Tokyo (JP); TORAY PLASTICS (AMERICA), INC., North Kingstown, RI (US)

(72) Inventors: Takashi Ichinomiya, Otsu (JP); Nobuhiro Naito, Otsu (JP); Naohiro Takashima, North Kingstown, RI (US); Jeffrey Stephen L'Heureux, North Kingstown, RI (US)

(73) Assignee: Toray Industries, Inc., Tokyo (JP)

( * ) Notice: Subject to any disclaimer, the term of this patent is extended or adjusted under 35 U.S.C. 154(b) by 183 days.

(21) Appl. No.: 15/558,004

(22) PCT Filed: May 11, 2017

(86) PCT No.: PCT/US2017/032128
§ 371 (c)(1),
(2) Date: Sep. 13, 2017

(87) PCT Pub. No.: WO2018/063447
PCT Pub. Date: Apr. 5, 2018

(65) Prior Publication Data
US 2018/0312360 A1 Nov. 1, 2018

Related U.S. Application Data

(60) Provisional application No. 62/401,275, filed on Sep. 29, 2016.

(51) Int. Cl.
*B65H 27/00* (2006.01)
*F16C 13/00* (2006.01)
(Continued)

(52) U.S. Cl.
CPC ............. *B65H 27/00* (2013.01); *B65H 18/08* (2013.01); *B65H 18/28* (2013.01); *F16C 13/00* (2013.01);
(Continued)

(58) Field of Classification Search
CPC ................................. B65H 27/00; F16C 13/00
(Continued)

(56) References Cited

U.S. PATENT DOCUMENTS 6,982,116 B1 * 1/2006 Passman ............... B05D 7/02
428/292.1
2001/0051567 A1 * 12/2001 Schaschke ............ B41N 7/00
492/56
(Continued)

FOREIGN PATENT DOCUMENTS

JP 4361685 12/1992
JP 2001131314 A 5/2001
(Continued)

OTHER PUBLICATIONS

International Search Report and Written Opinion for International Application PCT/US2017/032128, dated Aug. 8, 2017—8 Pages.
(Continued)

*Primary Examiner* — Jason L Vaughan
(74) *Attorney, Agent, or Firm* — RatnerPrestia

(57) ABSTRACT

A nip roller includes a core material having a surface coated with rubber. The nip roller having a support length $L_1$ of 5 m or longer. The rubber surface has a hardness H (deg) equal to or lower than 65 deg as measured by a JIS K6253 Type A durometer (A type). Mass W (kg) of the nip roller and second moment of area $I_1$ (m⁴) and the Young's modulus $E_1$ (Pa) of the core material satisfy $E_1 I_1 / W \geq 80000$.

7 Claims, 6 Drawing Sheets

(51) Int. Cl.
   *B65H 18/08* (2006.01)
   *B65H 18/28* (2006.01)
   *F16C 3/02* (2006.01)

(52) U.S. Cl.
   CPC .... *F16C 13/006* (2013.01); *B65H 2401/2311* (2013.01); *F16C 3/026* (2013.01); *F16C 2208/02* (2013.01); *F16C 2208/10* (2013.01)

(58) Field of Classification Search
   USPC .................................. 492/39, 48, 80, 53, 56
   See application file for complete search history.

(56) References Cited

U.S. PATENT DOCUMENTS

2003/0131743 A1* 7/2003 Sauer ................. B41F 7/26
                                                    101/348
2012/0201572 A1* 8/2012 Kim ................... B29C 67/24
                                                    399/176
2016/0121598 A1* 5/2016 Zhou .................. B41F 3/54
                                                    101/216

FOREIGN PATENT DOCUMENTS

| | | |
|---|---|---|
| JP | 2003097541 A | 4/2003 |
| JP | 2004093585 A | 3/2004 |
| JP | 2008081239 A | 4/2008 |
| JP | 2011121665 A | 6/2011 |
| JP | 2016117578 A | 6/2016 |
| WO | 2016117634 A1 | 7/2016 |

OTHER PUBLICATIONS

International Preliminary Report on Patentability and Written Opinion for International Application No. PCT/US2017/032128, dated Apr. 2, 2019, 5 pages.

* cited by examiner

NIP ROLLER AND METHOD OF MANUFACTURING FILM ROLL BODY

CROSS REFERENCE TO RELATED APPLICATIONS

This is the U.S. National Phase application of PCT/US2017/032128, filed May 11, 2017, which claims priority to U.S. Provisional Application No. 62/401,275, filed Sep. 29, 2016, the disclosures of these applications being incorporated herein by reference in their entireties for all purposes.

TECHNICAL FIELD OF THE INVENTION

The present invention relates to a nip roller usable for manufacturing a plastic film and the like, and a method of manufacturing a film roll body of a plastic film using the nip roller.

BACKGROUND OF THE INVENTION

Plastic films are widely used for magnetic tapes and optical members such as flat panel displays, as well as food packages, film capacitors, and other applications, and such plastic film products are ultimately wound into a film roll body by a winder for shipment.

A plastic film may undergo corona discharge surface treatment in a part of the film conveyance process as a pre-process for secondary processing such as bonding on a film surface, as described in Patent Literature 1. In Patent Literature 1, a film runs on the grounded conveyance roller called counter electrode roller, and an electrode, provided at a position opposed to the roller with the film interposed, applies alternating current (AC) high voltage to the electrode surface-side of the film for discharge treatment. A nip roller is installed at a position where the film comes into contact with the counter electrode roller, in order that the counter electrode roller contact surface-side of the film is not treated by discharge when the electrode surface-side of the film is subjected to the discharge treatment. The pressing force by the nip roller prevents a large amount of air from intruding into the gap between the counter electrode roller and the film and prevents discharge treatment on the counter electrode roller contact surface-side of the film.

In the manufacturing process for plastic films, when the width and the speed are increased to improve the productivity of films, vibration of the counter electrode roller and the nip roller increases to deform the rubber coating on the surface of the nip roller and change the roller cross section from a perfect circle into a polygonal shape. The reason for this phenomenon is that resonance occurs even though the rotation frequency of the roller is initially controlled in a frequency range lower than the first-order eigen frequency of the roller alone and the first-order eigen frequency of the entire apparatus. The frequency observed at this moment is an integer multiple (N times) of the rotation frequency, and the matching of this frequency with the eigen frequency causes continuous resonance, which gradually deforms the roller surface into a polygonal shape having N vertices.

This problem will be examined in terms of a method of manufacturing a film roll body. For example, in the aforementioned corona treatment unit, much air intrudes between the film and the counter electrode roller in polygon cycles, resulting in a defect of unintended, periodic corona discharge treatment on the counter electrode roller surface.

Another problem similar to this is an angular deformation phenomenon in a press roll for dewatering in a paper machine in a papermaking process as disclosed in Patent Literature 2. This angular deformation phenomenon is described as resonance caused when a frequency N times the rotation frequency of the top roller and the bottom roller included in the press roller system matches the eigen frequency of a press roller apparatus replaced with a vibration model of a multi-degree of freedom system, and this phenomenon is thought to be similar to the polygonal deformation phenomenon as described above. As an approach to the phenomenon, it is proposed to change the diameters of the top roller and the bottom roller such that the outer diameter ratio between these rollers is not 1, so as to prevent a match with the eigen frequency assumed from a frequency N times the rotation frequency. This approach avoids a perfect match between an integer multiple of the rotation frequency and the eigen frequency and avoids resonance, thereby preventing polygonal deformation.

Similarly, as another approach to the press roller polygonal deformation phenomenon in paper machines, Patent Literature 3 avoids vibration between rollers at a particular frequency by continuously varying the operating speed and preventing the same parts in rubber members on the surfaces of the rollers from being pressed with a large pressure, thereby preventing or retarding polygonal deformation. It is also suggested that the time to avoid a resonance point is increased by fluctuating the speed.

PATENT LITERATURE

Patent Literature 1: Japanese Patent Application Laid-open No. 2001-131314
Patent Literature 2: Japanese Patent Application Laid-open No. 2003-97541
Patent Literature 3: Japanese Patent Application Laid-open No. 4-361685

SUMMARY OF THE INVENTION

With the method in Patent Literature 2, however, it is difficult to cope with the case where the eigen frequency of the nip roller (press roller) system or each roller slightly changes over time. For example, when the rubber coating on the roller surface is hardened in use over time, the eigen frequency slightly changes as a consequence, because in the case of a multi-degree of freedom system, the top roller is supported on the bottom roller by the hardened rubber. In this case, even when a roller having such an outer diameter that falls out of N times is introduced, the eigen frequency matches N times after a few months to cause resonance again. The inventor of the present application also has found that such hardening of rubber reduces damping force of the system, and when the damping force is reduced, resonance occurs when a frequency N times the operating rotation frequency does not completely coincides but merely approaches the eigen frequency. Therefore, merely slightly shifting the speed or the outer diameter does not lead to a fundamental solution.

In particular, in the corona discharge treatment process for films, it has been found that shifting of the outer diameter ratio cannot avoid polygonal deformation because polygonal deformation occurs only with a frequency N times the rotation frequency of either the counter electrode roller or the nip roller. Unlike the papermaking process, in the manufacturing process for plastic films, films of different thicknesses are often manufactured in the same production process, in which the film thickness is generally controlled by adjusting the drawing speed in forming a sheet. When the method in Patent Literature 2 is applied to the manufacturing process for plastic films, the film thickness varies because the drawing speed is changed for avoiding vibration, and thus the method in Patent Literature 2 does not provide a permanent approach.

When the approach in Patent Literature 3 of fluctuating the operating speed is applied to the plastic film manufacturing process, the thickness of the film varies when the polymer extrusion output is constant. In order to fluctuate the operating speed with a constant thickness, it is necessary to fluctuate the extrusion output, which causes variation in kneading state in the plastic film manufacturing using an extruder in which melting and kneading of polymer is performed. Moreover, because of the presence of the stretched process including heating and cooling processes, it is difficult to fluctuate the operating speed.

As described above, for nip rollers suitable for the process of plastic films and the like, there has been no effective means for preventing polygonal deformation of the rollers.

A nip roller according to an embodiment of the present invention for solving the above-described problem includes a core material having a surface coated with rubber, the nip roller having a support length $L_1$ of 5 m or longer. The rubber surface has a hardness H (deg) equal to or lower than 65 deg as measured by a JIS K6253 Type A durometer (A type), and mass W (kg) of the nip roller and second moment of area $I_1$ (m$^4$) and Young's modulus $E_1$ (Pa) of the core material satisfy a mathematical expression (1) below:

$$E_1 I_1 / W \geq 80000 \qquad (1).$$

In the nip roller according to the present invention, it is preferable that the core material of the nip roller is CFRP, and it is more preferable that the CFRP has a Young's modulus $E_1$ equal to or greater than 250 GPa.

A method of manufacturing a film roll body according to an embodiment of the present invention includes conveying a film by a plurality of conveyance rollers and winding the film into a film roll body. Any one of the above-described nip rollers is provided in proximity to the film coming into contact with one or more of the conveyance rollers, the nip roller being configured to squeeze the film with the conveyance roller(s).

In the method of manufacturing a film roll body according to the present invention, it is preferable that a corona treatment electrode is arranged, downstream from the nip roller in a film conveyance direction, on an opposed surface to a surface of the conveyance roller in contact with the film so as to sandwich a film conveyed between the nip roller and the conveyance roller.

In the method of manufacturing a film roll body according to the present invention, it is preferable that rotation frequency $f_2$ (Hz), mass $W_2$ (Kg), support length $L_2$ (m), second moment of area $I_2$ (m$^4$), and Young's modulus $E_2$ (Pa) of a conveyance roller arranged in proximity to the nip roller as well as rotation frequency $f_1$ (Hz), mass W (Kg), and support length $L_1$ (m) of the nip roller, and second moment of area $I_1$ (m$^4$) and Young's modulus $E_1$ (Pa) of the core material satisfy after-mentioned mathematical expressions (2) and (3).

In the method of manufacturing a film roll body according to the present invention, it is preferable that each of the nip roller and the conveyance rollers has a damper at an axial end of each of the nip roller and the conveyance rollers.

In the present invention, "rotation frequency" refers to a frequency in a unit time of one second, obtained by dividing the roller operating speed by the roller circumferential length.

Embodiments of the present invention can achieve both high quality and productivity of plastic films without deforming a nip roller into a polygonal shape even when plastic films are manufactured in the form of film roll bodies with large width and at high speed.

DETAILED DESCRIPTION OF EMBODIMENTS OF THE INVENTION

Preferable embodiments of the present invention will be described below with reference to the drawings by taking the example of the application to a method of manufacturing a plastic film roll body.

Figure 1:
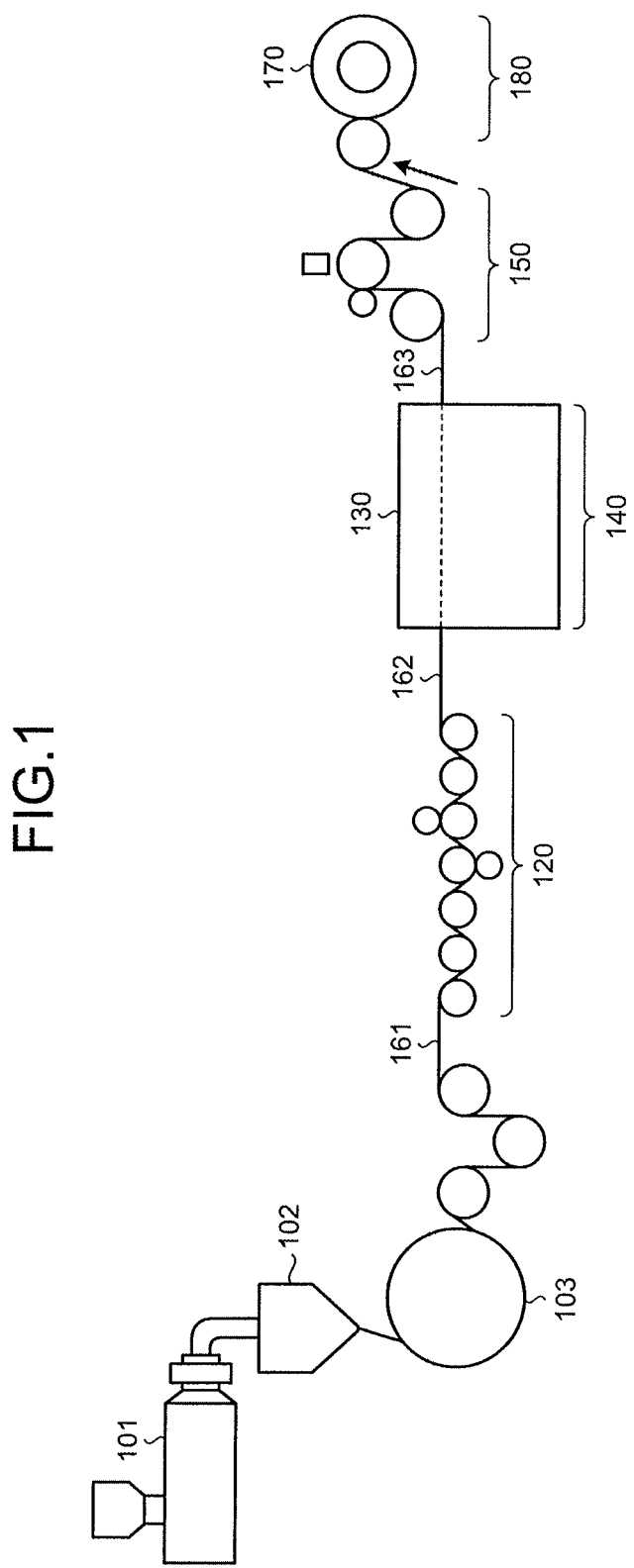
FIG. 1 is a schematic side view of an embodiment of a manufacturing apparatus for a plastic film roll body according to the present invention.

FIG. 1 is a schematic side view of a manufacturing apparatus for a plastic film roll body according to the present invention. FIG. 1 only illustrates the principal part and does not illustrate a frame for fixing the structure or some of conveyance rollers.

Here, a plastic film to form a plastic film roll body 170 by way of example is supplied from any source. As a preferable example, as illustrated in FIG. 1, for example, thermoplastic resin is molten and kneaded in an extruder 101, discharged in the form of a sheet from a die 102 having a slit on the bottom, casted onto a cooling drum 103, cooled and solidified thereon, and shaped into an unstretched sheet 161. The thickness of the unstretched sheet 161 can be controlled by adjusting the speed of the cooling drum relative to the flow rate determined by the amount of discharge and the slit width of the die.

Subsequently, the unstretched sheet 161 is introduced to a longitudinal stretched process 120 and stretched by a plurality of rollers in the sheet conveyance direction. Thereafter, with both ends of a uniaxially stretched sheet 162 held by clips continuously as necessary, while the sheet is heated and kept warm in an oven 130 in a lateral stretched process 140, the sheet conveyed in the direction of travel is stretched in the sheet width direction (the direction orthogonal to the conveyance direction) to obtain a biaxially stretched film 163. Alternatively, the produced plastic film may be kept unstretched or may be uniaxially stretched.

The illustrated biaxially stretched film 163 passing through the oven 130 in FIG. 1 is wound into the film roll body 170 as a roll-like product in a winding process 180. In the apparatus in FIG. 1, in the conveyance process between the lateral stretched process 140 and the winding process 180, surface treatment can be performed as necessary through a corona discharge treatment process 150.

Figure 2:
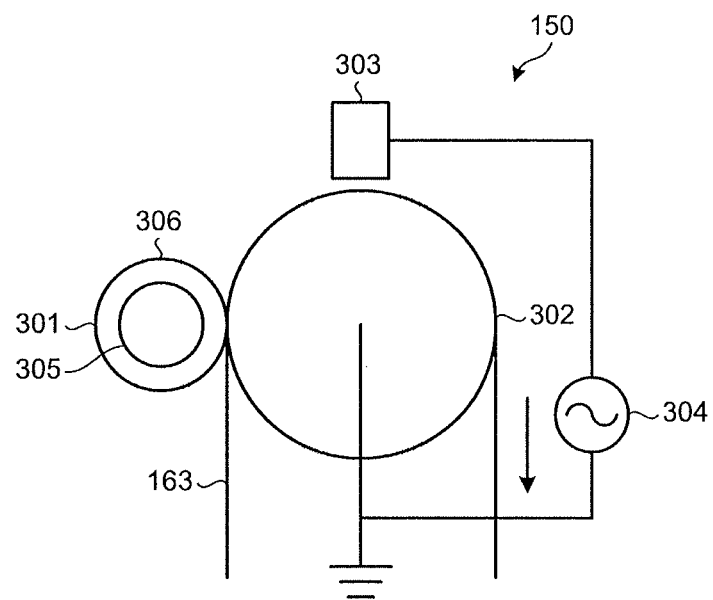
FIG. 2 is a schematic side view illustrating an exemplary of corona discharge treatment device in a method of manufacturing a plastic film roll body according to the present invention.

FIG. 2 is a schematic diagram of the corona discharge treatment process 150 using the nip roller of an embodiment of the present invention. An electrode 303 for corona discharge is provided to be opposed to the surface of a conveyance roller 302 with the biaxially stretched film 163 interposed. The electrode 303 is connected to an AC high-voltage power supply 304, and the conveyance roller 302 is grounded. The AC high-voltage power supply 304 applies high voltage to the electrode 303 to produce corona discharge from the electrode 303 to treat the electrode-side surface of the biaxially stretched film 163 passing through the gap between the conveyance roller 302 and the electrode 303. The corona discharge treatment activates the surface of the biaxially stretched film 163 and generally improves wettability. This treatment facilitates application of coating liquid or vapor deposition of metal on the surface of the biaxially stretched film 163 in the subsequent process.

In a case where corona discharge treatment is performed on a single surface of the biaxially stretched film 163, surface treatment is not to be performed on the surface of the biaxially stretched film 163 that does not face the electrode 303. In order to prevent discharge between this surface and the conveyance roller 302 serving as the ground-side electrode, it is necessary to bring the conveyance roller 302 and the biaxially stretched film 163 into intimate contact with each other. Since the amount of accompanying air between the conveyance roller 302 and the biaxially stretched film 163 increases with increasing conveyance speed of the biaxially stretched film 163, a nip roller 301 is attached as illustrated in FIG. 2 to eliminate the accompanying air with its pressing force and bring the conveyance roller 302 and the biaxially stretched film 163 into intimate contact with each other. The nip roller 301 includes a core material 305 having a surface coated with rubber 306. The nip roller 301 squeezing the biaxially stretched film 163 is arranged together with the conveyance roller 302 on the film upstream side of the conveyance roller 302, thereby preventing discharge on the surface of the biaxially stretched film 163 on the conveyance roller 302 side and preventing surface treatment by unnecessary discharge. In a case where corona discharge treatment is performed on both surfaces of the biaxially stretched film 163, the process in FIG. 2 is arranged in two stages in the conveyance process, and the placement surface of the electrode 303 and the contact surface of the conveyance roller 302 are reversed. Also in this case, in each corona discharge treatment process, it is necessary to attach the nip roller 301 to bring the conveyance roller 302 and the biaxially stretched film 163 into intimate contact with each other.

In the manufacturing process for a plastic film roll body, a nip roller may be used to divide a tension control section between the upstream zone and the downstream zone of the process. For example, in the manufacturing apparatus for the plastic film roll body 170 in which the extruder 101, the longitudinal stretched process 120, and the lateral stretched process 140 as illustrated in FIG. 1 serve as a film supply source and the film is wound in the winding process 180 without provision of the corona discharge treatment process 150, the winding tension in the winding process 180 and the output tension in the lateral stretched process 140 are controlled by a nip roller arranged in the stage subsequent to the lateral stretched process 140.

This is because, for example, when cutting is performed in the upstream zone and the film roll body is wound in the downstream zone, tension suitable for cutting and tension suitable for winding are not always the same. For example, when the optimum tension in the upstream zone is 100 [N] and the optimum tension in the downstream zone is 50 [N], the tension difference of 100−50=50 [N] has to be balanced somewhere. When a nip roller is used, friction force of μ×P is produced according to Coulomb's law, where the pressing force of the nip roller is P [N] and the coefficient of friction between the opposing roller and the film is μ. When the above-noted tension difference 50 [N] is equal to or smaller than this friction force of μ×P, the tension difference can be balanced by a nip roller system. This is generally called tension cut.

In the manufacturing process for a film roll body, a nip roller may be used as a contact roller. The contact roller is pressed against the film roll body to reduce the air accompanying the film roll body, thereby alleviating or preventing wrinkles or meandering in winding.

Figure 3:
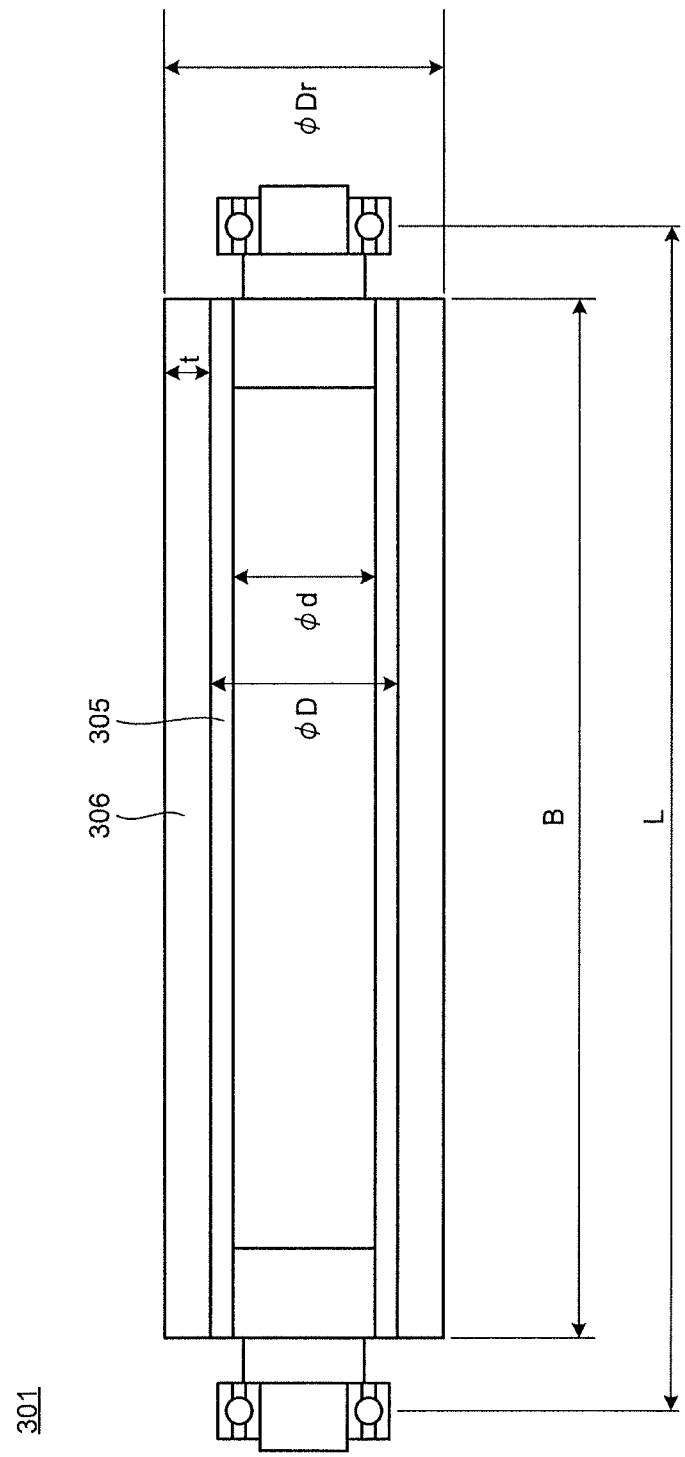
FIG. 3 is a schematic cross-sectional view of an embodiment of a nip roller of the present invention.

These nip rollers need to have a uniform pressing force in the film width direction and the roller axial direction. For this reason, in order to achieve a pressing force as uniform as possible even in the presence of uneven thickness of the film or small deflection of the roller, the surface of the core material 305 of the nip roller 301 is coated with the rubber 306 as illustrated in FIG. 3. In the manufacturing process for a plastic film roll body, the pressing force of the nip roller per unit width is preferably 50 N/m to 3 kN/m when, for example, the nip roller 301 is used to eliminate the accompanying air in tension cut, corona treatment, and winding. Considering the life of rubber and deflection of the roller, the upper limit of pressing force of the nip roller is further preferably 1 kN/m or less. In this range of pressing force, the appropriate rubber hardness H for obtaining a uniform pressing force in the width direction is equal to or less than 80 [deg]. The rubber hardness is a value measured by a JIS K6253 Type A durometer (A type).

The inventor of the present application has conducted a study and found that this rubber hardness is an important factor that determines whether the surface of the nip roller 301 deforms into a polygonal shape when the nip roller 301 and the conveyance roller 302 (this pair will hereinafter be referred to as a nip roller system) resonantly vibrate due to flexural deformation while mutually acting as a vibration source and a support. In order to suppress resonance in addition to achieving a uniform pressing force, the rubber hardness H need to be further smaller than 80 [deg] and equal to or smaller than 65 deg. The rubber 306 layer on the surface of the nip roller 301 may be monolayer or multilayer including two layers or three layers. When the rubber 306 layer is multilayer, the hardness of the softest layer is equal to or smaller than 65 [deg].

When the rubber hardness H is equal to or smaller than 65 [deg], the softness of the rubber 306 acts as damping force for preventing resonance that is the cause of polygonal deformation. The lower limit of hardness of the rubber 306 is preferably equal to or greater than 25 [deg] in terms of forming homogenous rubber.

The rubber 306 has a coating thickness t of, preferably 1 to 20 mm, suitably, 5 to 15 mm, in terms of preventing resonance. The thickness of 5 mm or more ensures a sufficient damping force. The thickness of 15 mm or less increases the eigen frequency of the nip roller 301 itself and facilitates implementation of the condition of the mathematical expression (1) described later.

Preferable examples of the material of the rubber 306 include general vulcanized rubbers, for example, nitrile butyl rubber (NBR), chloroprene rubber (CR), ethylene propylene rubber (EPDM), and Hypalon rubber (CSM). In particular, rubber is required to have resistance against ozone degradation because discharge produces ozone in the corona treatment process. Therefore, in this case, among vulcanized rubbers, EPDM and SCM are suitable. Other suitable examples include silicone rubber and fluoroe-rubber.

In order to ensure that the damping force by the rubber 306 acts in the width direction, it is preferable to minimize local variation in pressing force due to deflection of the nip roller system. It is therefore preferable to apply crowning such that the outer diameter Dr of the surface of the nip roller 301 is increased at the center and reduced at the ends in accordance with the amount of nip roller deflection.

Polygonal deformation resulting from resonance is more likely to occur because the rotation of the nip roller 301 becomes unstable as the roller surface length B [m] or the support length $L_1$ [m] increases. In particular, this issue will be discussed for the nip roller 301 having a support length $L_1$ [m] of 5 [m] or more, considering its operating speed range and the suitable nip roller diameter, in the manufacturing process for a plastic film roll body.

The inventor of the present application has found that in a nip roller structure as illustrated in FIG. 3, the Young's modulus $E_1$ [Pa] of the core material 305 of the nip roller 301, the second moment of area $I_1$ [m$^4$] of the core material 305, and the total mass W [kg] of the nip roller 301 should satisfy mathematical expression (1) below as means for preventing polygonal deformation resulting from resonance.

$$E_1 I_1 / W \geq 80000 \qquad (1).$$

In the mathematical expression (1), the product of the Young's modulus $E_1$ and the second moment of area $I_1$ represents the flexural rigidity of the core material 305. The mass W of the nip roller 301 functions as the mass m of the nip roller 301 in the resonance phenomenon and forms part of the eigen frequency with the flexural rigidity $E_1 I_1$ above. Therefore, this means that the eigen frequency of the nip roller 301 alone and the eigen frequency of the entire nip apparatus as a nip system become larger as the value of the mathematical expression (1) becomes larger.

Here, a rotor such as the nip roller 301 is rotatably supported, for example, by a frame (not illustrated) with shaft bush such as bearings on both ends of the shaft thereof. Pressing force is applied by a pressuring device such as an air cylinder attached to the nip roller 301 or the conveyance roller 302. In order to convey a plastic film generally thin and wrinkly, it is necessary to accurately set the degree of parallel between the conveyance rollers. For this reason, preferably, the nip roller 301 is moved by the air cylinder.

For the same reason, to control the operating speed, preferably, the conveyance roller 302 fixed in position is coupled to and driven by a rotation drive source such as a motor, and the nip roller 301 is driven to rotate by the conveyance roller 302 with the biaxially stretched film 163 interposed.

The mass W of the nip roller 301 also serves as a vibrating force source for producing vibration. As previously mentioned, the nip roller 301 rotates about the rotation center of the bearing, but the rotation completely free from eccentricity throughout the roller longitudinal direction is impossible in actuality. In fabrication of the nip roller 301, it is impossible to form the front surface or the inner surface of the core material 305 into a perfect cylinder throughout the longitudinal direction by machining and polishing, and in addition, the material itself has density variation to some extent. As illustrated in FIG. 3, the axial end having the bearing fitted thereon is fitted with the core material 305, but it is impossible to assemble them with no eccentricity. Then, the international standards define the amount of residual eccentricity in fabrication of such rotors. For example, according to the requirements by Japanese Industrial Standards JIS B0905 (1992), for any eccentricity attributable to several reasons as described above, assuming that the mass W of the nip roller 301 is eccentric by ε, the nip roller 301 should be fabricated such that the product of the operating number of rotations n and ε falls within a certain amount. The physical basing for this is the centrifugal force (Wεω$^2$) that produces vibration during rotation at an angular velocity ω when the nip roller 301 with a mass W is eccentric by ε. Since ε cannot be directly grasped, a temporary weight is installed on the front surface or the side surface of the nip roller 301 to find the radius r and the weight m at which the observed vibration amplitude is small. Given that the centrifugal force is balanced in a state in which the vibration amplitude is smallest, Wεω$^2$=mrω$^2$ holds, and ε can be indirectly obtained from ε=rm/W. This operation is similar to the balancing operation for vehicular tires.

According to JIS B0905 above, given the operating number of rotations n [rpm], εn/9550 is called balance quality. In general, a roller used in the manufacturing process for a plastic film roll body is produced by adjusting unbalance of the roller such that the balance quality of the above-noted expression falls within 6.3 or less, or 2.5 or less. Here, according to JIS B0905, ε noted above is the amount of eccentricity of the entire roller that is calculated from three values: the mass of the entire roller, the mass of the weight in a balancing test, and the attachment radius of the weight, and expressed in μm. The value n is the test number of rotations to simulate the use number of rotations of the roller and is expressed in rpm. Accordingly, for the nip roller 301 for a plastic film roll body fabricated based on these standards, the mass W of the nip roller 301 is the cause of vibration.

As described above, the left side of the mathematical expression (1) represents the eigen frequency as the cause of resonance and the centrifugal force as the vibration source, and the hardness H of the rubber 306 represents the damping force of the system. The inventor of the present application has found that in a method of producing a plastic film roll body using a nip roller having a support length $L_1$ [m] of 5 [m] or longer and the rubber hardness H of 65 deg or lower, it is possible to prevent resonance and prevent the nip roller 301 from being deformed into a polygonal shape for the long term by satisfying the mathematical expression (1), even in a severe condition that conventionally produces resonance or polygonal deformation when the frequency N times the normal rotation frequency matches or approaches the eigen frequency.

If the left side of the mathematical expression (1) is less than 80000, the centrifugal force serving as a vibration source exceeds the damping force in the above-noted preferable range of hardness of the rubber 306 and the rigidity $E_1 I_1$ of the core material 305 itself of the roller to cause resonance. Specifically, the resonance phenomenon to be solved by the invention of the present application occurs when Nf, which is an integer multiple of the operating frequency of the nip roller 301 or the conveyance roller 302, matches or approaches the eigen frequency of the apparatus.

Figure 5:
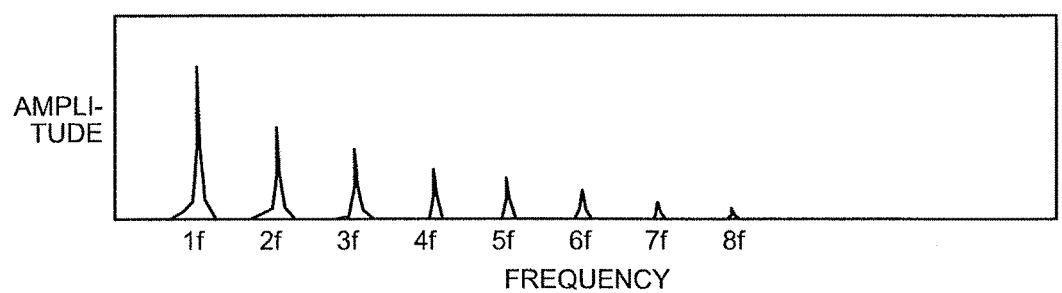
FIG. 5 is a schematic diagram illustrating a fast Fourier transform of a vibration waveform during integer-multiple vibration.

When the nip roller 301 and the conveyance roller 302 that satisfy the mathematical expression (2) are operated, the waveform as illustrated in FIG. 5 is obtained by measuring the vibration of the nip roller 301 surface and the bearing unit and fast Fourier transforming the measurements. The horizontal axis represents the frequency of a vibration component, and the vertical axis represents the amplitude of a vibration component separated frequency-by-frequency. It is understood that, although there is small variation depending on measurement noise, the amplitude of the higher frequency component is smaller as illustrated in FIG. 5. When the left side of the mathematical expression (1) is equal to or greater than 80000, the eigen frequency increases and the eigen frequency matches or approaches Nf with a smaller amplitude in FIG. 5. When the left side of the mathematical expression (1) is equal to or greater than 80000, the centrifugal force of if decreases and the amplitudes of Nf decreases accordingly. The nip roller 301 of the present invention can be suitably used in a method of producing a large plastic film roll body. Considering the preferable speed condition for a plastic film roll body, the nip roller system that satisfies the mathematical expression (1) achieves a stability condition in which resonance is not observed, based on the relation between rigidity, damping, and centrifugal force, even when an integer multiple of the operating frequency, Nf, matches or approaches the eigen frequency.

Here, the second moment of area $I_1$ of the core material can be obtained according to $\pi(D^4-d^4)/64$ from the outer diameter D and the inner diameter d of the core material 305 in FIG. 3. Here, in order to satisfy the mathematical expression (1), $I_1$ is increased and W is reduced.

In other words, in order to increase $I_1$, the outer diameter D of the core material 305 is increased. Given that the preferable range of the thickness t of the rubber 306 layer is 1 to 20 mm as previously mentioned, D=(Dr-40) mm to (Dr-2) mm holds, where Dr is the outer diameter of the rubber 306 layer. In order to obtain a linear pressure such that no air intrudes between the conveyance roller 302 and the biaxially stretched film 163, the outer diameter Dr of the rubber 306 layer and the outer diameter D of the core material 305 should not be unnecessarily increased. For this reason, the outer diameter Dr of the rubber 306 layer is preferably equal to or smaller than 1000 mm, more preferably equal to or smaller than 800 mm.

Although the mass W of the nip roller 301 includes the mass of the rubber 306 and the ends of shaft supported by bearings, the mass of the pipe portion of the core material 305 is dominant in a case where $L_1 \geq 5$ [m]. The mass of the pipe is proportional to the cross-sectional area $A=\pi(D^2-d^2)/4$. For the sake of explanation, when the second moment of area $I_1$ is divided by the cross-sectional area A, $I_1/A=(D^2+d^2)/16$, indicating that a pipe having a larger inner diameter d can increase the left side of the mathematical expression (1) where the outer diameter D of the core material 305 is the same.

Attention is further given to the Young's modulus $E_1$ and the mass W as means for increasing the mathematical expression (1). The mass W is proportional to the density $\rho$ of the material in addition to the cross-sectional area A as described above. To increase the left side of the mathematical expression (1), $E_1/W$ is increased, that is, $E_1/\rho$ is increased. In general, when steel generally used for the core material 305 of the nip roller 301 is used as a reference, the Young's modulus $E_1$ is about 206 GPa and the density $\rho$ is 7.85 g/cm$^3$, and then $E_1/\rho \approx 26$. In a case of aluminum alloy, $E_1$=73 GPa, $\rho$=2.77 g/cm$^3$, and then $E_1/\rho \approx 26$, which is almost the same as that of steel.

CFRP (carbon fiber reinforced plastic) has been widely used for industrial rollers as well as automobiles, air planes, and other applications. Carbon fibers used in CFRP include PAN fibers formed by baking acrylic fibers and pitch fibers derived from petroleum and are made of anisotropic material having high strength and rigidity in the longitudinal direction of fibers. Such carbon fibers are arranged in some directions and bonded by thermosetting resin such as epoxy resin to form CFRP, which is a structure serving as an alternative material to isotropic materials such as steel. The density of this composite material is about $\rho$=1.5 g/cm$^3$ and the Young's modulus $E_1$ can be selected based on the material of carbon fibers used and the orientation design of carbon fibers arranged in the structure. In general, industrial rollers are often designed from about 100 GPa up to about 200 GPa as an alternative to steel.

With the Young's modulus of about 200 GPa, CFRP has $E_1/\rho$ of 133, which value is five times as high as iron or aluminum alloy. CFRP used as a material of a pipe, being formed from yarn or sheet material of carbon fibers, has fewer restrictions in fabrication of inner and outer diameters compared with steel and aluminum alloy and has a higher degree of freedom of choice in the second moment of area $I_1$. Noting such characteristics, the inventor of the present application has found that CFRP is suitable for satisfying the condition of the mathematical expression (1).

Further preferably, with $E_1 \geq 250$ GPa, the second moment of area $I_1$ can be reduced while the mathematical expression (1) is satisfied, so that it is possible to reduce the outer diameter Dr of the nip roller 301 and to improve the performance of removing the air, which is the essential function of the nip roller 301. A long nip roller 301 having a support length $L_1$ equal to or longer than 5 [m] inherently has a larger mass W, and therefore $E_1 \geq 250$ GPa is preferred in order to satisfy the value of the mathematical expression (1) to prevent vibration. The CFRP having such high elasticity can be implemented with carbon fibers or stacked structures and can prevent vibration and polygonal deformation to be solved the invention of the present application, but is usually not used because it is expensive. Although the higher $E_1$ is advantageous to prevent resonance, as a matter of course, industrial rigid carbon fibers having a Young's modulus of about 800 GPa, commonly available, are expensive. Therefore, CFRP with $E_1$=250 to 350 GPa or so that can be used in the invention of the present application is in a preferable range in terms of a trade-off between costs and performance.

The flexural Young's modulus $E_1$ of the nip roller using CFRP can be known from the stack design in designing and fabricating CFRP. In this case, the elastic modulus $E_{11}$ in the axial direction of the roller or the cylinder is employed as $E_1$. In the stack design of CFRP, manufactures of rollers can calculate, for example, the practical ratio at which carbon fibers actually contribute to rigidity and strength from the direction of carbon fibers, the volume content Vf of fibers relative to resin in the form of a composite material, and single yarn breakage. Alternatively, $E_1$ may be obtained through actual measurement. The actual $E_1$ is known to be reduced compared with $E_{11}$ by the effects of shear deformation due to anisotropy, in addition to the design parameters of CFRP as described above. The most reliable value can be obtained by putting the core material 305 (pipe having the outer diameter D, the inner diameter d, and the effective surface length B) of the nip roller 301 in FIG. 3 singly on a support and then measuring the eigen frequency by a hitting method or performing an inverse calculation from deflection with a known load applied. After the coating with the rubber 306 in FIG. 3 and after the insertion and installation of the shaft, the inverse calculation from eigen frequency or deflection becomes complicated. In this case, we have to rely on numerical calculations such as the finite element method and need to carefully handle calculation precision and the like as objective data. When the nip roller 301 alone is rotated with increasing number of rotations, the damping of the rubber 306 does not act in the nip roller 301 having $L_1 \geq 5$ m targeted by the invention of the present application, so that nonlinear harmonic vibration is observed, and resonance with a small amplitude is observed with the number of rotations that is ½ or ⅓ of the first-order eigen frequency. By using this, the actual Young's modulus $E_1$ may be inversely calculated.

Figure 4:
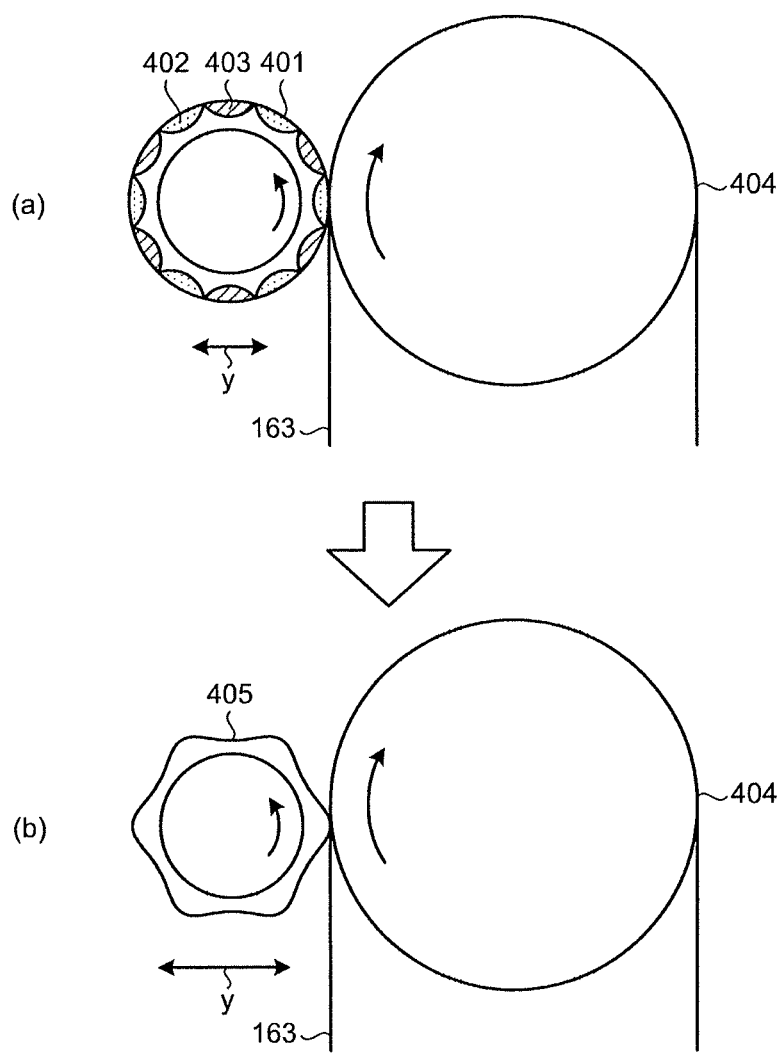
FIG. 4 is a schematic diagram illustrating an example of polygonal deformation of a conventional nip roller.

The nip roller of the invention of the present application is suitable as a nip roller in each process for a plastic film roll body as previously mentioned, and more suitable as the nip roller 301 for use in the corona discharge treatment process in FIG. 2. FIG. 4 is a schematic diagram illustrating a conventional nip roller 401 periodically receiving large surface pressure on a peripheral part of the rubber over the long term due to vibration caused by resonance, and illustrating a polygonal deformation phenomenon as a consequence. As illustrated in (a) of FIG. 4, a high surface-pressure portion 402 receiving a large pressure due to vibration in the direction of the arrow y forms a depression when compared with a low surface-pressure portion 403 receiving a small pressure due to vibration. As illustrated in (b) of FIG. 4, the nip roller 401 becomes a nip roller 405 having a polygonal surface over time. If such polygonal deformation occurs in the corona discharge treatment process, the surface of the biaxially stretched film 163 that is in contact with a conveyance roller 404 undergoes unintentional discharge treatment in vibration cycles to lead to defects of the biaxially stretched film 163 as previously mentioned. Therefore, applying the nip roller 301 of the invention of the present application in a method of manufacturing a film roll body including a corona discharge treatment process has a greater significance than the use as other nip rollers or contact roller applications.

In the method of manufacturing a film roll body including a corona discharge treatment process according to an embodiment of the present invention, the electrode 303 for producing corona discharge in FIG. 2 may have a conventionally used shape. For example, the shapes that concentrate an electric field and facilitate corona discharge, such as knife edge shape, plate shape, wire shape, and needle shape, have been devised.

The conveyance roller 302 serving as a ground electrode has a surface coated with a dielectric layer, for example, formed of metal or preferably semiconductor such as rubber having excellent ozone resistance and strength, such as silicone rubber, fluoroe-rubber, EPDM rubber, CSM rubber, and ceramics in order to prevent spark discharge. Electrical insulation performance is preferably $10^{11}$ Ωcm or higher.

Preferable examples of the raw material of the plastic film of the present invention include polyesters such as polyethylene terephthalate and polyethylene-2,6-naphthalate, polyolefins such as polyethylene and polypropylene, polyvinyls such as polyvinyl chloride and polyvinylidene chloride, and polymers such as polyamides, aromatic polyamides, and polyphenylene sulfide. Particularly preferable examples are polyethylene terephthalate films and polypropylene films having excellent stretchability and being excellent in optical properties, electrical properties, and gas barrier characteristic.

The resonance phenomenon that is the cause of polygonal deformation will now be examined theoretically. As previously mentioned, when a nip roller having a predetermined support length $L_1$ [m] is operated, a vibration waveform is observed at the nip roller surface and the bearing unit. The relation between frequency and amplitude of the fast Fourier-transformed vibration waveform is as illustrated in FIG. 5. It is understood that, although there is small variation depending on measurement noise, the amplitude of a higher frequency component is smaller as illustrated in FIG. 5.

In a situation in which no resonance occurs, the largest one of vibration components is the roller rotation frequency component f denoted by if, which means one time of f. When the rotation frequency of the nip roller is defined as $f_1$ [Hz], the mass of the nip roller is defined as W [kg], and the amount of eccentricity of the nip roller is defined as ε [m], the centrifugal force F [N/m] due to residual unbalance illustrated by the mathematical expression (7) below always acts on the nip roller and the conveyance roller to produce a vibration component $1f_1$. This is fast and has greater amplitude because F increases as f increases.

$$F = 2\pi\varepsilon f_1^2 \qquad (7)$$

The integer multiple components following 2f are non-linear vibration caused by, for example, small looseness of the roller support. Such a nonlinear component is difficult to remove and always exists, as is the case with centrifugal force due to residual unbalance as described above.

For example, when 6f, which is six times as high as the roller rotation frequency, matches the eigen frequency of the apparatus, resonance occurs to cause the nip roller to be deformed with a polygonal number of "6" over time as illustrated in FIG. 4.

Conventionally, attention has been focused on finding a condition in which an integer multiple component Nf does not perfectly match the eigen frequency of the apparatus by adjusting the speed or the roller diameter. Unfortunately, the eigen frequency changes over time due to hardening of rubber, and moreover, it is not easy to adjust the production speed in the manufacturing process for a plastic film roll body as previously mentioned.

The inventor of the present application has paid attention to the vibration characteristics in FIG. 5 to find that the greater the integer multiple component N is, the smaller the amplitude is, and searched for a condition in which even if Nf matches the eigen frequency by maximizing the eigen frequency, the damping force of the system exceeds the vibrating force and prevents resonance. As a result, the inventor has found that when the condition of the mathematical expression (1) is satisfied, resonance is not caused in the method of producing a plastic film roll body and in the nip roller having predetermined rubber hardness and support length for use in the method of producing a plastic film roll body.

In addition, the inventor of the present application has found a more detailed determination condition concerning the condition of suppressing resonance or polygonal deformation. The nip roller system as illustrated in FIG. 2 includes the conveyance roller 302 and the nip roller 301, and their eigen frequencies resonate in such a shape that the vibration waveforms are different with increasing frequency, as is the case with string vibration. This is called eigen mode of vibration, and each roller has first-order, second-order, third-order, and high-order eigen modes of vibration infinitely from the low frequency side. The nip roller 301 and the conveyance roller 302 are in contact with each other with the rubber 306 and the biaxially stretched film 163 interposed and can be considered as an integrated device. Here, the vibration modes of these rollers interfere with each other, and the vibration waveform and the eigen frequency have shape and value close to the eigen mode of vibration of each roller alone, per se but are slightly shifted. In this eigen mode, deformation into a polygonal shape occurs in an antiphase mode in which the nip roller 301 and the conveyance roller 302 each flexurally vibrate in an arc shape and both vibrate so as to collide with each other.

Figure 7:
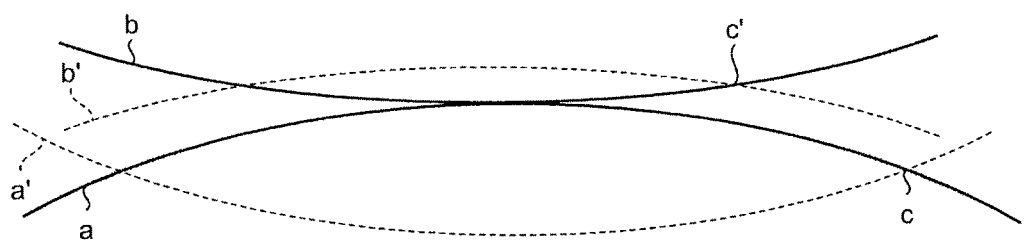
FIG. 7 is a schematic diagram illustrating vibration displacement in a high-order antiphase eigen mode of the nip roller system.

FIG. 7 schematically illustrates displacement of the roller surface in the aforementioned antiphase mode in the high-order eigen mode of the nip roller and the conveyance roller. The solid line a illustrates a phase when the nip roller is displaced toward the conveyance roller, and this is set as 0° phase. The conveyance roller displacement at the same time is denoted by the solid line b, which indicates that the center is displaced toward the nip roller. The dashed lines a' and b' in FIG. 7 illustrate the roller displacements after half a cycle in the same eigen frequency, and both illustrate that the center is displaced away from the counterpart roller. That is, as can be understood from FIG. 7, in the antiphase mode, when the nip roller 301 vibrates and is displaced toward the conveyance roller 302, the conveyance roller 302 also vibrates and is displaced toward the nip roller 301, and the vibration mode is formed such that the rollers collide with each other.

As a eigen frequency of the entire nip roller system, this antiphase mode is a high-order eigen frequency and changes with the structure, rigidity, and mass of the rollers. The inventor of the present application has found that when the antiphase eigen frequency of the entire nip roller system matches or approaches the N-time frequency Nf that sub-ordinately occurs due to nonlinear rattle of one-time vibration 1f resulting from roller unbalance, the nip roller system exhibits resonance in the antiphase mode as illustrated in FIG. 7, and continuous and periodical collision occurs at a particular section as illustrated in FIG. 4 to accelerate polygonal deformation.

Therefore, the roller structure, rigidity, and mass are set to satisfy the mathematical expression (1) of the invention of the present application, so that the nip roller 301 applied in the method of producing a plastic film roll body can increase the antiphase eigen frequency appearing in high orders, for example, fourth-order and fifth-order and can have a large N of the N-time frequency Nf of a roller unbalance cycle that matches or approaches the antiphase eigen frequency. Because of a combination of Nf with sufficiently small amplitude illustrated in FIG. 5 and the eigen frequency, the damping force exceeds energy of resonance, thereby preventing polygonal deformation.

The high-order antiphase eigen frequency of the nip roller system as the cause of polygonal deformation can be obtained by eigenvalue analysis such as numerical structure calculations such as the finite element method for the entire nip roller apparatus or can be estimated from the actual vibration displacement and frequency observation by analogy.

Figure 6:
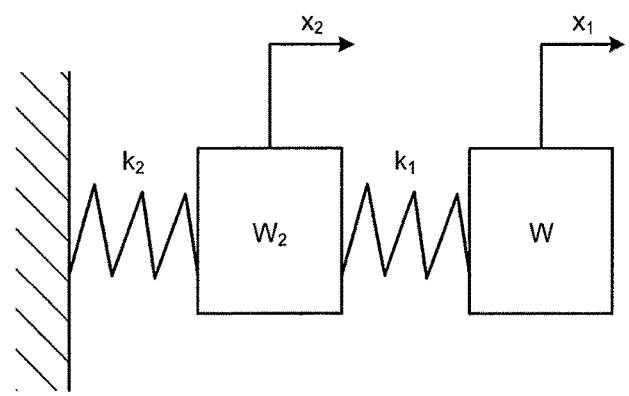
FIG. 6 is a diagram illustrating a two-degree of freedom system modeled on the nip roller system.

Here, the inventor of the present application has found a method of avoiding polygonal deformation as a method of producing a plastic film roll body in a simpler way, based on a relation between the high-order antiphase eigen frequency and the operating frequency, by replacing the vibration model of the entire nip system with a two-degree of freedom system in FIG. 6.

When the nip roller 301 has a mass of W and an equivalent rigidity of $k_1$, and the conveyance roller 302 has a mass of $W_2$ and an equivalent rigidity of $k_2$, the mass ratio m0 ($W_2$/W) and the corresponding eigen frequencies $f_{01}$ and $f_{02}$ of the rollers are as illustrated by the mathematical expression (5) below. Here, the equivalent rigidity is calculated by the mathematical expression (6) below.

$$m_0 \equiv \frac{W_2}{W}, f_{01} \equiv \sqrt{\frac{k_1}{W}}, f_{02} \equiv \sqrt{\frac{k_2}{W_2}} \quad (5)$$

$$k_n \equiv \frac{\pi E_n I_n}{L_n^4} (n = 1, 2) \quad (6)$$

The eigen frequency of the two-degree of freedom system in FIG. 6 is known, and the mass ratio m0 and the corresponding eigen frequencies $f_{01}$ and $f_{02}$ calculated by the mathematical expressions 5 and 6 give "two degrees of freedom", and therefore two eigen frequencies are obtained. Here, it has been found that, of the two, one eigen frequency fe corresponding to the eigen frequency of the nip roller 301 illustrated by the mathematical expression (4) below has high correlation with the antiphase eigen frequency of the nip roller system obtained through numerical calculations as described above.

$$f_e^2 = \frac{1}{2}\left\{f_{02}^2 + f_{01}^2 + m_0 f_{02}^2 + \sqrt{(f_{02}^2 + f_{01}^2 + m_0 f_{02}^2)^2 - 4 f_{01}^2 f_{02}^2}\right\} \quad (4)$$

Furthermore, assuming that the vibrating force is the centrifugal force resulting from the unbalance of the nip roller 301 and the conveyance roller 302 as illustrated by the mathematical expression (7), the response amplitude of forced vibration in this case is thought to be proportional to the right sides of the mathematical expression (2) and the mathematical expression (3) based on the linear vibration solution of a one-degree of freedom system. The denominator of the right side indicates that the amplitude becomes larger during resonance, because it approaches zero when the operating frequencies $f_2$ and $f_1$ of the conveyance roller 302 serving as a counter electrode and the nip roller 301 match or approach the eigen frequency fe. The numerator W indicates that the centrifugal force as the vibrating force increases in proportion to the roller masses W, $W_2$.

Based on such parameters, the inventor of the present application has searched for a stability condition that has a large Nf to such an extent that resonance and polygonal deformation do not occur, and found that the inequalities of the mathematical expression (2) and the mathematical expression (3) below should be satisfied.

$$20 \geq \frac{W}{(f_e/f_1)^2 - 1} \quad (2)$$

$$20 \geq \frac{W}{(f_2/f_2)^2 - 1} \quad (3)$$

All of the numerical solutions of the antiphase eigen frequency of the nip system using the above-noted finite element method and the two-degree of freedom system eigen frequency illustrated by the mathematical expression (4) are essentially linear vibration solutions. For the consistency with that the N-time frequency results from nonlinear vibration, it is assumed that the mechanism of occurrence of N-times vibration per se results from nonlinear rattle and the mechanism per se by which the N-time frequency matches or approaches the eigen frequency to cause resonance does not include many errors in linear vibration analysis. Under this assumption, a stability boundary as to the presence/absence of resonance and polygonal deformation was set through measurement in the actual apparatus to obtain the determination formulae of the mathematical expressions (1) to (5).

It has been found that polygonal deformation results from the antiphase mode. In this mode, "nodes" of vibration, that is, the sections where displacement is zero are located not on the axial ends of the nip roller but between both axial ends as illustrated in FIG. 7. Therefore, the support corresponding to each axial end is preferably provided with an air damper or oil damper for suppressing vibration to further improve the damping force in the entire system and to retard resonance and polygonal deformation even when rubber is hardened to some degree to reduce damping.

EXAMPLES

Although a specific description will be given with examples below, the present invention is not limited by those examples.

Example 1

The extruder 101, the longitudinal stretched process 120, and the lateral stretched process 140 illustrated in FIG. 1 were set as a film supply source, and a film roll was obtained by the method of producing the plastic film roll body 170, the method including the winding process 180 for winding a film (not including the corona discharge treatment process 150). A polypropylene biaxially stretched film was produced from the above-noted supply source at a rate of 450 m/min, and the winding tension and the output tension at the lateral stretched process were cut by the nip roller arranged in the stage subsequent to the lateral stretched process 140.

The nip roller to be used in Example 1 had the structure as illustrated in FIG. 2 with a roller surface length B=9.8 m and a roller support length $L_1$=9 m, CFRP designed to have a Young's modulus $E_1$=320 GPa was used for the core material of the nip roller. The outer diameter D of the nip roller was 490 mm. The pressing force for squeezing the biaxially stretched film 163 between the nip roller 301 and the conveyance roller 302 opposed to the nip roller was 50 N/m. In addition, the material of rubber was EPDM having a hardness H=45 deg so as to satisfy the mathematical expression (3). The conveyance roller 302 had a diameter of 450 mm, and the core material was steel. The roller surface length and the support length of the conveyance roller 302 were the same as in the nip roller 301. Other characteristics are as illustrated in Table 1. Through these processes, a plastic film roll body 170 having a width of 9 m and a film thickness of 4 μm was obtained.

In the nip roller of Example 1, the value of the left side of the mathematical expression (1) is 266339, greater than 80000. The value of the right side of the mathematical expression (2) is 6.6, and the value of the right side of the mathematical expression (3) is 2.9, both smaller than 20.

The antiphase eigen frequency obtained beforehand by finite element analysis in the present nip roller system is 43 Hz, which is about nine times as high as the operating frequency of the nip roller and about eight times as high as the operating frequency of the conveyance roller.

Example 2

In the almost same configuration as Example 1, the corona discharge treatment process 150 having the nip roller 301 in FIG. 2 was provided in part of the manufacturing process for a plastic film roll body in FIG. 1. The details of the corona discharge treatment process are as illustrated in FIG. 2. The upper surface side of the biaxially stretched film 163 was subjected to discharge treatment by the electrode 303 connected to the AC high-voltage power supply 304. The nip roller 301 has the same configuration as in Example 1. The conveyance speed is 450 m/min, which is the same as in Example 1, and the pressing force of the nip roller 301 is 300 N/m. The surface of the nip roller 301 was provided with crowning of 1.5 mm to ensure uniformity in the width direction. The surface lengths and the support lengths of the nip roller 301 and the conveyance roller 302 are the same as in Example 1. The outer diameter of the conveyance roller 302 serving as the counter electrode in discharge treatment is 500 mm and the core material is steel. The roller surface length and the support length of the conveyance roller 302 are the same as in the nip roller 301.

In the nip roller of Example 2, the value of the left side of the mathematical expression (1) is 266339, greater than 80000. The value of the right side of the mathematical expression (2) is 7.2, and the value of the right side of the mathematical expression (3) is 3.1, both smaller than 20.

The antiphase eigen frequency obtained beforehand by finite element analysis in the present nip roller system is 50 Hz, which is about ten times as high as the operating frequency of the nip roller and about ten times as high as the operating frequency of the conveyance roller.

Example 3

A film roll body was produced under the same conditions as in Example 2, except that CFRP having a Young's modulus of 107 GPa was used as the core material of the nip roller 301.

In the nip roller of Example 3, the value of the left side of the mathematical expression (1) is 89057, which is considerably smaller than that in Examples 1 and 2 but greater than 80000. The value of the right side of the mathematical expression (2) is 19.7, and the value of the right side of the mathematical expression (3) is 8.4, both smaller than 20.

The antiphase eigen frequency obtained beforehand by finite element analysis in the present nip roller system is 40 Hz, which is about eight times as high as the operating frequency of the nip roller and about eight times as high as the operating frequency of the conveyance roller.

Example 4

A film roll body was produced under the same conditions as in Example 3 except that rubber having a rubber hardness H of 60 [deg] was used for the rubber layer of the nip roller 301.

In the nip roller of Example 4, the value of the left side of the mathematical expression (1) is 89057, greater than 80000. The value of the right side of the mathematical expression (2) is 19.7, and the value of the right side of the mathematical expression (3) is 8.4, both smaller than 20.

The antiphase eigen frequency obtained beforehand by finite element analysis in the present nip roller system is 41 Hz because of a high rubber hardness and is about eight times as high as the operating frequency of the nip roller and about eight times as high as the operating frequency of the conveyance roller.

Comparative Example 1

A film roll body was produced under the same conditions as in Example 2 except that CFRP having a Young's modulus of 90 GPa was used for the core material of the nip roller 301.

In the nip roller of Comparative Example 1, the value of the left side of the mathematical expression (1) is 74908, smaller than 80000. The value of the right side of the mathematical expression (3) is 9.6, smaller than 20, whereas the value of the right side of the mathematical expression (2) is 22.8, greater than 20. This is attributable to a low rigidity $E_1 I_1$ of the nip roller although the support length $L_1$ of the nip roller exceeds 5 m.

The antiphase eigen frequency obtained beforehand by finite element analysis in the present nip roller system is 35 Hz, which is about seven times as high as the operating frequency of the nip roller and about seven times as high as the operating frequency of the conveyance roller.

Comparative Example 2

A plastic film roll body was produced under the same conditions as in Example 2 except that the nip roller as described later was used as the nip roller in the corona discharge treatment process. The outer diameter of the nip roller is 400 mm and the core material is steel. The inner and outer diameters of the core material and other characteristics are as illustrated in Table 1.

In the nip roller of Comparative Example 2, the value of the left side of the mathematical expression (1) is 30564, smaller than 80000. The value of the right side of the mathematical expression (2) is 31.6, and the value of the right side of the mathematical expression (3) is 45.5, both greater than 20. This is attributable to a low rigidity $E_1 I_1$ and a large mass W of the nip roller although the support length $L_1$ of the nip roller exceeds 5 m.

The antiphase eigen frequency obtained beforehand by finite element analysis in the present nip roller system is 30 Hz, which is about six times as high as the operating frequency of the nip roller and about five times as high as the operating frequency of the conveyance roller.

Comparative Example 3

A film roll body was produced under the same conditions as in Example 3 except that rubber having a rubber hardness H of 70 [deg] was used for the rubber layer of the nip roller 301.

In the nip roller of Comparative Example 3, the value of the left side of the mathematical expression (1) is 89057, greater than 80000. The value of the right side of the mathematical expression (2) is 19.7, and the value of the right side of the mathematical expression (3) is 8.4, both smaller than 20.

The antiphase eigen frequency obtained beforehand by finite element analysis in the present nip roller system is 42 Hz because of a high rubber hardness and is about eight times as high as the operating frequency of the nip roller and about eight times as high as the operating frequency of the conveyance roller.

Comparative Example 4

Based on the description in the related art of Patent Literature 2, vibration evaluation was conducted for a press roller in a papermaking process. For the details not described in Patent Literature 2, the evaluation was conducted according to the specifics in Table 2 based on specifications in a general papermaking process.

The value of the left side of the mathematical expression (1) is 714599, greater than 80000, but the rubber hardness corresponding to a pressing force of 30 kN required for dewatering is H=80 deg, higher than 65 deg.

The value of the right side of the mathematical expression (2) and the value of the right side of the mathematical expression (3) are both 23.6, greater than 20. This is because the operating speed differs greatly from that in the method of producing a plastic film roll body.

The antiphase eigen frequency obtained beforehand by finite element analysis in the present nip roller system is 89 Hz, which is about 13 times as high as the operating frequency of the nip roller and about 13 times as high as the operating frequency of the conveyance roller.

[Presence/Absence of Resonance]

An acceleration detector manufactured by ONO SOKKI CO., LTD. (Type: NP-2090) was attached to the nip roller bearing member to obtain acceleration data. Displacement converted data was fast Fourier transformed and determined on the following criterion.

Presence: an amplitude of displacement of 10 µm or more was observed with the expected eigen frequency (in a ±10 Hz range).

Absence: an amplitude of displacement of 10 µm or more was not observed with the expected eigen frequency (in a ±10 Hz range).

[Presence/Absence of Polygonal Deformation]

For the roller in which resonance was observed, the nip roller was removed and supported rotatably, and displacement of the roller surface was measured at low speed rotation (rotation by hand) and determined on the following criterion.

Presence: in displacement data, the ratio between the operating frequency and the eigen frequency N±1 protrusions were observed on the roller surface, and the height of protrusions was equal to or greater than 50 µm after swelling was removed.

Absence: the above-noted conditions for "presence" are not applicable.

[Other Problems Caused by Polygonal Deformation]

A plastic film subjected to the corona discharge treatment was steamed, and whether periodical wettability appearing on the surface opposite to the treated surface was observed. If the opposite surface is unintentionally treated, many water drops of steam adhere to the treated portion, and a stripe pattern corresponding to the polygon cycles is observed in appearance.

Presence: unintentional discharge treatment occurring on the surface opposite to the corona discharge treatment surface.

Absence: unintentional discharge treatment did not occur on the surface opposite to the corona discharge treatment surface.

The conditions and results of Examples 1 to 4 and Comparative Examples 1 to 4 are illustrated in Tables 1 to 4.

TABLE 1

| | | Example 1 | Example 2 | Example 3 | Example 4 |
|---|---|---|---|---|---|
| | | | Manufacturing process for plastic film roll body | | |
| | Manufacturing process Use application | Nip roller for tension cut | Nip roller for corona discharge treatment | | |
| | Operating speed [m/min] | 450 | 450 | 450 | 450 |
| Conveyance roller | Rubber outer diameter [mm] | 450 | 500 | 500 | 500 |
| | Core material outer diameter [m] | 0.430 | 0.494 | 0.494 | 0.494 |
| | Core material inner diameter [m] | 0.405 | 0.464 | 0.464 | 0.464 |
| | Second moment of area $I_2$ [m$^4$] | 0.000358 | 0.000648 | 0.000648 | 0.000648 |
| | Core material | Steel | Steel | Steel | Steel |
| | Young's modulus $E_2$ [GPa] | 206 | 206 | 206 | 206 |
| | Support length $L_2$ [m] | 10 | 10 | 10 | 10 |
| | Spring constant $k_2$ | 716759 | 1299057 | 1299057 | 1299057 |
| | Mass $W_2$ [kg] | 1439 | 1823 | 1823 | 1823 |
| | Rotation frequency $f_2$ [Hz] | 5.3 | 4.8 | 4.8 | 4.8 |
| Nip roller | Rubber outer diameter [mm] | 490 | 490 | 490 | 490 |
| | Rubber hardness H [deg] | 45 | 45 | 45 | 60 |
| | Core material outer diameter [m] | 0.442 | 0.442 | 0.442 | 0.442 |
| | Core material inner diameter [m] | 0.4 | 0.4 | 0.4 | 0.4 |
| | Second moment of area $I_1$ [m$^4$] | 0.000617 | 0.000617 | 0.000617 | 0.000617 |
| | Core material | CFRP | CFRP | CFRP | CFRP |
| | Young's modulus $E_1$ [GPa] | 320 | 320 | 107 | 107 |
| | Support length $L_1$ [m] | 9 | 9 | 9 | 9 |
| | Spring constant $k_1$ | 2930786 | 2930786 | 979982 | 979982 |
| | Mass W [kg] | 741 | 741 | 741 | 741 |
| | Rotation frequency $f_1$ [Hz] | 4.9 | 4.9 | 4.9 | 4.9 |

TABLE 2

| | | Comparative Example 1 | Comparative Example 2 | Comparative Example 3 | Comparative Example 4 |
|---|---|---|---|---|---|
| | | | Manufacturing process for plastic film roll body | | Papermaking process |
| | Manufacturing process Use application | | Nip roller for corona discharge treatment | | Dewatering press roller |
| | Operating speed [m/min] | 450 | 450 | 450 | 2000 |
| Conveyance roller | Rubber outer diameter [mm] | 500 | 500 | 500 | 1500 |
| | Core material outer diameter [m] | 0.494 | 0.494 | 0.494 | 1.5 |
| | Core material inner diameter [m] | 0.464 | 0.464 | 0.464 | 1.453 |
| | Second moment of area $I_2$ [m$^4$] | 0.000648 | 0.000648 | 0.000648 | 0.0297 |
| | Core material | Steel | Steel | Steel | Steel |
| | Young's modulus $E_2$ [GPa] | 206 | 206 | 206 | 206 |
| | Support length $L_2$ [m] | 10 | 10 | 10 | 10 |
| | Spring constant $k_2$ | 1299057 | 1299057 | 1299057 | 59563877 |
| | Mass $W_2$ [kg] | 1823 | 1823 | 1823 | 8557 |
| | Rotation frequency $f_2$ [Hz] | 4.8 | 4.8 | 4.8 | 7.1 |
| Nip roller | Rubber outer diameter [mm] | 490 | 400 | 490 | 1500 |
| | Rubber hardness H [deg] | 45 | 45 | 70 | 80 |
| | Core material outer diameter [m] | 0.442 | 0.340 | 0.442 | 1.5 |
| | Core material inner diameter [m] | 0.4 | 0.302 | 0.4 | 1.453 |
| | Second moment of area $I_1$ [m$^4$] | 0.000617 | 0.000248 | 0.000617 | 0.029712 |
| | Core material | CFRP | Steel | CFRP | Steel |
| | Young's modulus $E_1$ [GPa] | 90 | 206 | 107 | 206 |
| | Support length $L_1$ [m] | 9 | 9 | 9 | 10 |
| | Spring constant $k_1$ | 824284 | 756697 | 979982 | 59563878 |
| | Mass W [kg] | 741 | 1668 | 741 | 8557 |
| | Rotation frequency $f_1$ [Hz] | 4.9 | 6.0 | 4.9 | 7.1 |

TABLE 3

| | | Example 1 | Example 2 | Example 3 | Example 4 |
|---|---|---|---|---|---|
| | | | Manufacturing process for plastic film roll body | | |
| | Manufacturing process Use application | Nip roller for tension cut | Nip roller for corona discharge treatment | | |
| Eigen frequency of two-degree of freedom system | Mass ratio $m_0$ | 0.515 | 0.406 | 0.406 | 0.406 |
| | $f_{02}$ [Hz] | 22 | 27 | 27 | 27 |
| | $f_{01}$ [Hz] | 63 | 63 | 36 | 36 |
| | $f_e$ [Hz] | 78.5 | 76.1 | 46.1 | 46.1 |

TABLE 3-continued

|  | Example 1 | Example 2 | Example 3 | Example 4 |
|---|---|---|---|---|
|  | Manufacturing process for plastic film roll body | | | |
| Manufacturing process Use application | Nip roller for tension cut | Nip roller for corona discharge treatment | | |
| Actually measured eigen frequency of nip roller system [Hz] | 43 | 50 | 40 | 41 |
| Mathematical expression (1)  $E_1I_1/W$ | 266339 | 266339 | 89057 | 89057 |
| Right side of mathematical expression (2) | 6.6 | 7.2 | 19.7 | 19.7 |
| Right side of mathematical expression (3) | 2.9 | 3.1 | 8.4 | 8.4 |
| Results  Presence/absence of resonance | Absent | Absent | Absent | Absent |
| Occurrence of polygonal deformation | Absent | Absent | Absent | Absent |
| Back surface discharge treatment defect | — | Absent | Absent | Absent |

TABLE 4

|  |  | Comparative Example 1 | Comparative Example 2 | Comparative Example 3 | Comparative Example 4 |
|---|---|---|---|---|---|
|  |  | Manufacturing process for plastic film roll body | | | Papermaking process |
| Manufacturing process Use application | | Nip roller for corona discharge treatment | | | Dewatering press roller |
| Eigen frequency of two-degree of freedom system | Mass ratio $m_0$ | 0.406 | 0.914 | 0.406 | 1.00 |
|  | $f_{02}$ [Hz] | 27 | 27 | 27 | 83 |
|  | $f_{01}$ [Hz] | 33 | 21 | 36 | 83 |
|  | $f_e$ [Hz] | 43.0 | 36.6 | 46.1 | 135.0 |
| Actually measured eigen frequency of nip roller system [Hz] | | 35 | 30 | 42 | 89 |
| Mathematical expression (1)  $E_1I_1/W$ | | 74908 | 30564 | 89057 | 714599 |
| Right side of mathematical expression (2) | | 22.8 | 31.6 | 19.7 | 23.6 |
| Right side of mathematical expression (3) | | 9.6 | 45.5 | 8.4 | 23.6 |
| Results  Presence/absence of resonance | | Present | Present | Present | Present |
| Occurrence of polygonal deformation | | Present | Present | Absent | Present |
| Back surface discharge treatment defect | | Present | Present | Absent | — |

[Discussion of the Results of Examples and Comparative Examples]

In Example 1, since CFRP having high rigidity is employed as the core material of the nip roller, a nip roller having a high Young's modulus of 320 GPa was produced while an increase in mass W was suppressed. The resulting nip roller satisfies the mathematical expression (1) and has a low vibrating force and a high eigen frequency. Moreover, since the rubber layer on the nip roller surface has a rubber hardness H of 65 deg or lower, the rubber hardness is adapted for the pressing force under a preferable condition for the manufacturing process for a plastic film roll body. The resulting nip roller satisfies the mathematical expression (2), exhibits a damping force for vibration, and is excellent in preventing vibration while the support length $L_1$ exceeds 5 m. In particular, the Young's modulus of the core material exceeds 250 GPa and the left side of the mathematical expression (1) is far greater than 80000 that is the boundary value of the stabilization region, thereby achieving sufficient stability. Since the eigen frequency is sufficiently high for the operating frequency of each roll suitable in the method of manufacturing a plastic film roll body, and the mathematical expression (2) and the mathematical expression (3) are satisfied, resonance can be suppressed and polygonal deformation can be prevented. This nip roller is suitable for a tension cut roller, because polygonal deformation is suppressed to eliminate the need for frequently replacing rollers and make the film less damaged.

The nip roller of Example 2 employs CFRP having high rigidity as the core material as in Example 1 and also employs a rubber layer having a predetermined rubber hardness H and a nip roller having a predetermined support length $L_1$. The resulting nip roller thus satisfies the mathematical expression (1) and suppresses resonance and polygonal deformation. In the operating conditions suitable for manufacturing a plastic film roll body, the mathematical expressions (2) and (3) are satisfied. No resonance occurred in the corona discharge treatment process. By preventing polygonal deformation caused by resonance, unintentional discharge treatment was suppressed on the surface opposite to the corona treatment surface of the plastic film roll body.

Example 3 was set under the same conditions as in Example 2 except for the Young's modulus of the nip roller core material. Since the Young's modulus is as low as 107 GPa, the value of the left side of the mathematical expression (1) is significantly reduced. Nevertheless, since the mathematical expression (1) is satisfied, resonance was not observed, and thus Example 3 was able to be used in the stabilization region. In the operating conditions suitable for manufacturing a plastic film roll body, since the mathematical expressions (2) and (3) were satisfied, resonance did not occur. Polygonal deformation caused by resonance was prevented, and preferable results were exhibited also in corona treatment.

Example 4 was set under the same conditions as in Example 3 except for the rubber hardness of the surface of the nip roller. Although the rubber hardness is as high as 60 deg, which is smaller than 65 deg, a sufficient damping force acted, and vibration did not occur.

Comparative Example 1 was set under the same conditions as in Examples 2 and 3 except for the Young's modulus of the nip roller core material, and the Young's modulus was further reduced compared with that in Example 3. Since the Young's modulus is as low as 90 GPa, the mathematical expression (1) is not satisfied, and thus resonance occurred. In the operating conditions suitable for manufacturing a film roll body, since the mathematical expression (2) was not satisfied, polygonal deformation occurred, and unintentional discharge treatment occurred on the surface opposite to the corona discharge treatment surface to cause a defect.

In Comparative Example 2, steel was employed as the core material of the nip roller. This nip roller has extremely poor dynamic stability because the value of the left side of the mathematical expression (1) is far smaller than 80000 that is the boundary value of the stabilization region. In the operating conditions suitable for manufacturing a film roll body, since the mathematical expression (2) and the mathematical expression (3) were not satisfied, resonance was observed. Polygonal deformation caused by resonance occurred, and unintentional discharge treatment occurred on the surface opposite to the corona discharge treatment surface to cause a defect.

Comparative Example 3 was set under the same conditions as in Examples 3 and 4 except for the rubber hardness of the surface of the nip roller, and the rubber hardness was set higher than that in Example 4. Since the rubber hardness is as high as 70 deg, the damping force was insufficient. Although Comparative Example 3 satisfies the mathematical expressions (1), (2), and (3), vibration occurred because the damping force of the nip roller is insufficient. However, in Comparative Example 3, polygonal deformation did not occur.

Comparative Example 4 is an example of application to a press roller in a papermaking process. Although the press roller in Comparative Example 4 satisfied the mathematical expression (1), the rubber hardness H was extremely high because of a high pressing force. Because of a high rubber hardness, sufficient damping was not obtained, and resonance occurred. Polygonal deformation also occurred. In the operating conditions suitable for a paper making process, since the mathematical expression (2) and the mathematical expression (3) are not satisfied, the eigen frequency is not sufficiently high for the operating frequency of each roller, which is thought to be one of the reasons of intense vibration.

As described above, the present invention can avoid resonance of the nip roller applied in the manufacturing process for a plastic film roll body and suppress polygonal deformation of rubber, and therefore can provide a plastic film roll body having excellent quality with excellent productivity with high speed and large width.

The present invention is extremely suitable for a method of manufacturing a plastic film roll body usable for packaging materials, capacitors, optical films for use in flat display panels and the like, and process protection films, although the application range is not limited to those.

REFERENCE SIGNS LIST 101 extruder
102 die
103 cooling drum
120 longitudinal stretched process
130 oven
140 stretched process
150 corona discharge treatment process
170 film roll body
180 winding process
161 unstretched sheet
162 uniaxially stretched sheet
163 biaxially stretched film
301 nip roller
302, 404 conveyance roller
303 electrode
304 AC high-voltage power supply
305 core material
306 rubber
401 nip roller (conventional product)
402 high surface-pressure portion
403 low surface-pressure portion
405 nip roller deformed into a polygonal shape
a surface displacement of the nip roller 301 at 0° phase
a' surface displacement of the nip roller 301 half a cycle after 0° phase
b surface displacement of the conveyance roller 302 at 0° phase
b' surface displacement of the conveyance roller 302 at phase half a cycle after 0° phase
c node at which vibration displacement of the nip roller 301 is zero
c' node at which vibration displacement of the conveyance roller 302 is zero

The invention claimed is:
1. A nip roller comprising
a core material having a surface coated with rubber, the nip roller having a support length $L_1$ of 5 m or longer, wherein
the rubber coating the surface has a hardness H (deg) equal to or lower than 65 deg as measured by a JIS K6253 Type A durometer (A type), and
mass W (kg) of the nip roller and second moment of area $I_1$ ($m^4$) and Young's modulus $E_1$ (Pa) of the core material satisfy a mathematical expression (1) below:

$$E_1 I_1 / W \geq 80000 \qquad (1).$$

2. The nip roller according to claim 1, wherein the core material of the nip roller is CFRP.
3. The nip roller according to claim 2, wherein the CFRP has a Young's modulus $S_1$ equal to or greater than 250 GPa.
4. A method of manufacturing a film roll body, comprising
conveying a film by a plurality of conveyance rollers and winding the film into a film roll body, wherein
a nip roller is provided in proximity to the film coming into contact with one or more of the conveyance rollers, the nip roller is configured to squeeze the film with the conveyance roller(s),
the nip roller includes a core material having a surface coated with rubber, the nip roller having a support length $L_1$ of 5 m or longer, the rubber surface has a hardness H (deg) equal to or lower than 65 deg as measured by a JIS K6253 Type A durometer (A type), and mass W (kg) of the nip roller and second moment of area $I_1$ (m$^4$) and Young's modulus $E_1$ (Pa) of the core material satisfy a mathematical expression (1) below:

$$E_1 I_1 / W \geq 80000 \tag{1}$$

5. The method of manufacturing a film roll body according to claim 4, wherein a corona treatment electrode is arranged, downstream from the nip roller in a film conveyance direction, on an opposed surface to a surface of the conveyance roller in contact with the film so as to sandwich a film conveyed between the nip roller and the conveyance roller.

6. The method of manufacturing a film roll body according to claim 4, wherein rotation frequency $f_2$ (Hz), mass $W_2$ (Kg), support length $L_2$ (m), second moment of area $I_2$ (m$^4$), and Young's modulus $E_2$ (Pa) of a conveyance roller arranged in proximity to the nip roller as well as rotation frequency $f_1$ (Hz), mass W (Kg), and support length $L_1$ (m) of the nip roller, and second moment of area $I_1$ (m$^4$) and Young's modulus $E_1$ (Pa) of the core material satisfy mathematical expressions (2) and (3) below:

$$20 \geq \frac{W}{(f_e/f_1)^2 - 1} \tag{2}$$

$$20 \geq \frac{W_2}{(f_e/f_2)^2 - 1} \tag{3}$$

where $$f_e^2 = \frac{1}{2}\left\{f_{02}^2 + f_{01}^2 + m_0 f_{02}^2 + \sqrt{(f_{02}^2 + f_{01}^2 + m_0 f_{02}^2)^2 - 4 f_{01}^2 f_{02}^2}\right\} \tag{4}$$

$$m_0 \equiv \frac{W_2}{W},\ f_{01} \equiv \sqrt{\frac{k_1}{W}},\ f_{02} \equiv \sqrt{\frac{k_2}{W_2}} \tag{5}$$

$$k_n \equiv \frac{\pi E_n I_n}{L_n^4}\ (n = 1, 2). \tag{6}$$

7. The method of manufacturing a film roll body according to claim 4, wherein each of the nip roller and the conveyance rollers has a damper at an axial end of each of the nip roller and the conveyance rollers.

* * * * *

UNITED STATES PATENT AND TRADEMARK OFFICE
CERTIFICATE OF CORRECTION

| | |
|---|---|
| PATENT NO. | : 10,370,215 B2 |
| APPLICATION NO. | : 15/558004 |
| DATED | : August 6, 2019 |
| INVENTOR(S) | : Takashi Ichinomiya et al. |

Page 1 of 1

It is certified that error appears in the above-identified patent and that said Letters Patent is hereby corrected as shown below:

On the Title Page

(73) Assignee should read: Toray Industries, Inc., Tokyo (JP)
Toray Plastics (America), Inc., North Kingstown, RI (US)

Signed and Sealed this
Seventh Day of April, 2020

Andrei Iancu
*Director of the United States Patent and Trademark Office*